Patented Aug. 26, 1924.

1,506,574

UNITED STATES PATENT OFFICE.

JACK H. DUNN, OF LEXINGTON, KENTUCKY, ASSIGNOR TO THE DUNN WHEAT COMPANY INC., OF LEXINGTON, KENTUCKY, A CORPORATION OF KENTUCKY.

PROCESS FOR TREATING WHEAT.

No Drawing. Application filed September 11, 1922. Serial No. 587,578.

*To all whom it may concern:*

Be it known that I, JACK H. DUNN, a citizen of the United States, residing at Lexington, in the county of Fayette and State of Kentucky, have invented certain new and useful Improvements in Processes for Treating Wheat, of which the following is a specification.

This invention relates to a process for treating wheat, and has for its object to provide a process, in a manner as hereinafter set forth, for the treatment of grains of wheat to produce, without eliminating any of the natural elements of the grains, an unusually nourishing food product and one, when used as a food, will act to correct many digestive disorders.

A further object of the invention is to provide a process for the purpose set forth, in a manner as hereinafter referred to, for the treatment of wheat grains to provide a food product which is unusually palatable, tender, of a golden color, and with the excessive taste of bran removed, and further with all the natural elements of the wheat retained.

The manner of treating wheat, in accordance with this process is as follows:—

The wheat selected to be treated in accordance with this process, is of that class which is full ripe, well matured, well filled of the freshest growth possible, generally termed in trade circles, #2 red. The selected wheat is screened and fanned, by any suitable means, at least five times, or until the wheat is free from dwarf and imperfect grains, as well as free from all foreign matter as is possible to obtain during the screening and fanning thereof. The fanned and screened wheat, in any suitable manner, is steamed, by subjecting the wheat to live steam, this step causes the grains to sweat, loosens and removes the gummy or gelatinous substances, bleaches the wheat, reduces the taste of bran, and further releases the air film and blanches the wheat. The regular flour-mill method of steaming may be employed for the foregoing step.

After the wheat has been steamed to the point desired, it is then immediately transferred from the steaming apparatus and deposited in perforated cylinders to provide for the circulation of air through the cylinders. The perforated cylinders containing the steamed wheat, are placed in tubes through which air is forced and circulated in any suitable manner, by way of example, circulating fans, and this action of the air on the wheat will dry the same, and the air circulation is continued until the steamed wheat is thoroughly dried. This step, which may be termed "an evaporation step" further removes the taste of bran, sets the color of the grains and renders the wheat ready for the polishing step.

The wheat is then polished, by slowly feeding the same through any suitable polishing machine, by way of example, one of the rotating brush type, and which polishes the grain to a bright golden color, thoroughly cleanses the grain and also wipes away any foreign matter that may have escaped during the foregoing steps.

After the wheat has been polished and cleaned by the preceding steps, the wheat is placed in containers, which are sealed air tight, and sealed so that no steam can escape when under pressure. Each of the containers is of the size to accommodate one-eleventh, by liquid weight, additional weight over the weight of the ingredients of a composition placed in each container, such composition consisting of water, sugar and salt. The proportions of the wheat with respect to the ingredients of the composition are as follows:—

To every ounce of wheat treated in the foregoing described manner, there is added two and one-eighth ounces of water, one-twenty-fourth ounce of sugar and one-seventy-second ounce of salt, smaller or additional amounts in proportion.

After the composition has been added to, each of the containers in which is placed the requisite amount of wheat, the container is sealed air and steam tight and allowed to stand for a period of ten hours, whereupon the container is placed in a steam cooker or retort, of any suitable type, and sterilized for about two hours, at about atmospheric steam pressure. At the end of the period of two hours, the steam pressure is increased to from five to eight pounds for a period of an hour, and the container is then removed from the retort and allowed to cool. After cooling, the liquid will all be fully absorbed, the natural elements of the wheat will be retained, the grains will be swollen to about three times their original size and will have an appetizing golden color rendered very palatable, tender and further having the excessive taste of bran removed.

Wheat treated in the foregoing described method or process, will produce a food product of the most nourishing kind, provide a delicious food, and further act as a means to correct many digestive disorders.

While the method herein set forth, is set up with respect to the treatment of wheat, it is to be understood, that the method can be employed for any purpose wherein it is found applicable, for example, the treatment of oats, rice, corn or other grains, as well as legumes.

What I claim is:—

1. A process of treating matured grain to provide a food product consisting of successively cleaning, steaming, thoroughly drying and then polishing the grain, then placing a predetermined quantity of grain in a receptacle and adding thereto a predetermined amount of water, sugar and salt, then permanently sealing the container air and steam tight, then allowing the contents of the container to settle for a predetermined period, then sterilizing the permanently sealed container while stationary at about atmospheric pressure for a predetermined period, then increasing the steam pressure as applied to the permanently sealed container for a predetermined period, then allowing the permanently sealed container and its contents to cool whereby the liquid will be fully absorbed and the grain swollen.

2. In a process of treating matured grain to provide a food product, placing a predetermined quantity of cleaned, steamed, thoroughly dried and polished grain in a container in the proportion of one ounce of the grain with two and one-eighth ounces of water, one-twenty-fourth ounce sugar and one-seventy-second ounce salt, then permanently sealing the container air and steam tight, then allowing the contents of the permanently sealed container to settle for a predetermined period, then sterilizing the permanently sealed container while stationary for a predetermined period at about atmospheric steam pressure, then increasing the steam pressure applied to the permanently sealed container for a predetermined period while the permanently sealed container is stationary and then allowing the permanently sealed container to cool whereby the liquid will be fully absorbed and the grain swollen.

3. A process of treating matured grain which consists in successively cleaning, steaming, thoroughly drying and then polishing the grain, then placing the grain into a receptacle with the addition of a composition formed of water, sugar and salt and in the proportion of one ounce of grain to two and one-eighth ounces of water, one-twenty-fourth ounce sugar and one-seventy-second ounce of salt, then permanently sealing the container air and steam tight and allowing the contents of the permanently sealed container to set for a period of ten hours, then sterilizing the permanently sealed container and its contents while the permanently sealed container is stationary for two hours at about atmospheric pressure, then increasing the steam pressure from five to eight pounds for a period of one hour while the permanently sealed container is stationary, and then allowing the permanently sealed container and its contents to cool whereby the liquid will be absorbed and the grain swollen.

In testimony whereof, I affix my signature hereto.

JACK H. DUNN.